(No Model.)

T. J. LOVETT.
CUSHION TIRE.

No. 588,342. Patented Aug. 17, 1897.

Witnesses:
Chas. S. Gaylord
Lute J. Salter

Inventor:
Thomas J. Lovett
By Dyrenforth & Dyrenforth
Attys

UNITED STATES PATENT OFFICE.

THOMAS J. LOVETT, OF CHICAGO, ILLINOIS, ASSIGNOR, BY DIRECT AND MESNE ASSIGNMENTS, TO THE BUDD DOBLE COMBINATION RUBBER TIRE COMPANY, OF NEW YORK.

CUSHION-TIRE.

SPECIFICATION forming part of Letters Patent No. 588,342, dated August 17, 1897.

Application filed March 1, 1897. Serial No. 625,544. (No model.)

*To all whom it may concern:*

Be it known that I, THOMAS J. LOVETT, a citizen of the United States, residing at Chicago, in the county of Cook and State of Illinois, have invented a new and useful Improvement in Cushion-Tires, of which the following is a specification.

My invention relates to improvements in metal-shod cushion-tires for use more especially upon vehicle-wheels.

My object is to provide a tire of this class possessing the desired qualities of resiliency and noiselessness in use and which shall be of an improved construction, rendering it particularly strong and durable, comparatively inexpensive to manufacture, and easy to repair.

Figure 1:
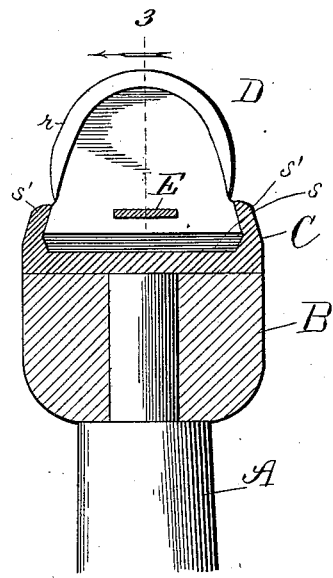
Figure 2:
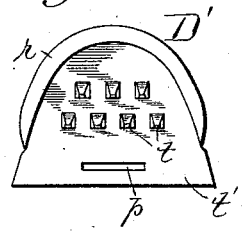
Figure 3:
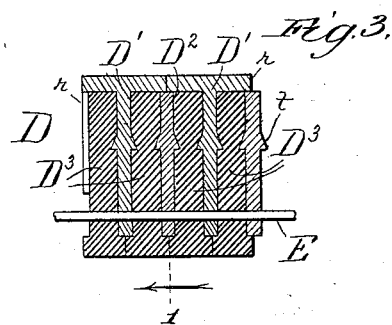
Figure 4:
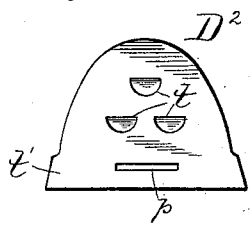
Figure 5:
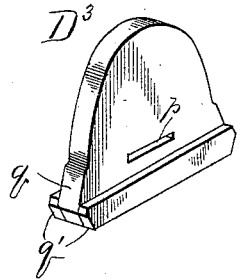

In the drawings, Figure 1 is a broken cross-section of the outer portion of a wheel constructed with my improvements, the section being taken on line 1 of Fig. 3; Fig. 2, a face view of a metal section forming a part of the tire; Fig. 3, a broken longitudinal section of the tire, the section being taken on line 3 of Fig. 1; Fig. 4, an intermediate metal section forming part of the tire construction, and Fig. 5 a perspective view of a section of cushioning material.

The gist of my invention lies in providing a tire formed of abutting sections extending crosswise of the circumference, the sections being pieces or segments of cushioning material, such as rubber and metal, and a sectional metallic shoe or tread carried by or integral with metal sections or pieces fastened and cushioned in the cushioning material.

In the figures which illustrate my invention in one desired form, A is the spoke of a wheel; B, the felly; C, a tire-retaining rim, and D the shod cushion-tire. The tire is formed with shoe-carrying metal sections D', intermediate sections D², of metal or other comparatively hard material, and sections D³, of cushioning material, intervening between the harder sections. The sections D' and D² may be provided in or on their opposite faces with shoulders $t$. They have preferably flaring base portions $t'$ to fit in an annular socket or channel $s$ in the rim C, the said channel presenting inward-inclined shoulders $s'$ on opposite sides. On the outer edge portions of the sections D' are flanges $r$, projecting from opposite sides. The sections or segments D³, which may be of any suitable cushioning material, preferably soft rubber, may be of the form shown in Fig. 5, with flaring base portions $q$ to fit and fill out the channel $s$ and provided at opposite sides with offsets or flanges $q'$. The outer edges of the sections D² and D³ are of the same contour as the inner surfaces of the flanges or shoe-sections $r$.

In forming the tire shown in the drawings the sections are slipped into the channel $s$, first a section D³, then a section D', then a section D³, and then a section D², this order being repeated throughout the circumference of the tire. As the sections are placed in position they are crowded forward to cause the shoulders $t'$ to become embedded in or interlocked with the abutting pieces of cushioning material. When the tire is completed, the interlocking of its members and the retaining action of the shoulders $s'$ cause the parts to be held in position with great security. The sections D' D² rest at their inner edges against the base portions or flanges $q'$ of the cushioning material and the flanges $r$ extend over the adjacent sections D³ and halfway over the adjacent sections D², as illustrated in Fig. 3. The sections $r$ of the shoe or tread portion abut against each other and rest at their abutting edges upon the intermediate hard sections D². Thus the tread portion or shoe may be substantially continuous, each of its sections being supported or suspended in cushioning material. As a further means for securing the sections in place upon the rim coincident openings $p$ may be provided through the base portions of the sections to receive a wire or band E, which is fastened together at its ends to form a continuous retaining-ring.

In the use of the wheel pressure upon any of the shoe-sections is also borne by the intermediate sections D² and distributed over the cushioning material with which said sections contact and in which they are cushioned or suspended, as described.

The sections D' may be formed of chilled steel or any other suitable and durable metal.

The sections $D^2$ may be of metal or any other hard material, such as wood, wood fiber, hard rubber, or the like. The cushioning material may be, and preferably is, rubber, though other soft and more or less resilient material may be employed. The sections $D^3$ may be molded or cut from a sheet, the sections shown in the figures being formed by providing a strip of rubber of the proper width and cementing on opposite sides of one edge narrow strips to form the flanges $q'$ when the sections are cut or stamped out of the strip.

By the use of a suitable compressing appliance, the construction of which it is not necessary to enter into, the sections may be quickly placed in position and compressed. The tread portion of the tire is effectively cushioned, whereby it is rendered resilient to a marked degree and particularly noiseless in use. As by far the greater area of exposed surface will be metal, the cushioning material is effectively housed against injury or wear. As rubber is very expensive, the fact that metal enters so largely into the construction of the tire greatly lessens the cost over solid rubber tires of the same dimensions. In the event that any of the sections become injured in use they may be removed and new sections substituted therefor. These sections may be kept in stock by blacksmiths or wheelwrights, who, with proper compressing appliances, may quickly make any necessary repairs.

If desired, instead of employing intermediate sections $D^2$ all the sections of hard material may be flanged to form tread-sections which will abut or nearly abut over the cushioning material.

I do not limit my invention to the employment of any particular materials either for the cushioning or protecting sections, nor to any particular contour of the tire and tread, nor to any form of rim or rim-channel. It will be understood, therefore, that the construction shown and described may be variously modified without departing from the spirit of my invention as defined by the claims.

What I claim as new, and desire to secure by Letters Patent, is—

1. As a new article of manufacture, a cushion-tire for wheels, comprising, in combination, separable crosswise-extending segments of cushioning material, and interposed crosswise-extending sections of a harder material held suspended by the cushioning material and having extended tread portions overlapping the cushioning-segments, the cushioning and cushioned parts being held under longitudinal pressure in crosswise-abutting relation, substantially as and for the purpose set forth.

2. As a new article of manufacture, a cushion-tire for wheels, comprising, in combination, separable crosswise-extending segments of rubber, and interposed crosswise-extending sections of metal held suspended by the rubber and having extended tread portions overlapping the rubber sections, the rubber and metal parts being held under longitudinal pressure in crosswise-abutting relation, substantially as and for the purpose set forth.

3. As a new article of manufacture, a cushion-tire for wheels, comprising, in combination, separate crosswise-extending segments of cushioning material, and interposed crosswise-extending sections of a harder material, suspended by the cushioning material, and having extended tread portions overlapping the cushioning-segments, the cushioning and cushioned parts having mutually-interlocking surfaces, and being held under longitudinal pressure in crosswise-abutting relation, substantially as and for the purpose set forth.

4. In combination, a channeled rim provided with a central slot flanked by inward-projecting shoulders presenting sockets on opposite sides of the slot, and a cushion-tire comprising, in combination, separate crosswise-extending segments of cushioning material, approximately filling out the channel at the base thereof, in the direction transversely of the circumference, and crosswise-extending sections of a harder material, held suspended by the cushioning material and having extended tread portions overlapping the cushioning-segments, to form an approximately continuous tread, and extending at opposite sides under the shoulders of the rim, and cushioned by the cushioning material, the parts being held in place under the longitudinal resilience of the cushioning material, substantially as and for the purpose set forth.

5. As a new article of manufacture, a cushion-tire for wheels, comprising, in combination, transverse flatwise-abutting alternate cushioning and cushioned sections, tread-sections carried by cushioned sections and overlapping the cushioning-sections, and a flexible retaining-ring for the sections extending longitudinally through the tire, substantially as and for the purpose set forth.

6. In combination, a cushion-tire, comprising transverse flatwise-abutting alternate cushioning and cushioned sections presenting annular engaging shoulders on opposite sides, and tread-sections carried by cushioned sections and overlapping the cushioning-layers, and a rim having an annular channel, for the reception of the tire, and retaining-shoulders for engaging the said shoulders on the tire, substantially as and for the purpose set forth.

7. A cushion-tire for wheels formed with sections $D^3$ of cushioning material provided with projecting base portions $q'$, and sections $D'$ of metal, between the sections $D^3$, carrying tread-sections and resting against the said base portions, the sections being fastened together under pressure, substantially as and for the purpose set forth.

8. A cushion-tire for wheels having sections $D'$ of metal carrying metal tread-sections $r$, sections $D^2$ of hard material between the sections $D'$, and sections $D^3$ of cushioning material intervening between the sections D' D² and provided with base portions $q'$ against which the harder sections rest, the sections being fastened together under pressure, substantially as and for the purpose set forth.

9. A cushion-tire for wheels having sections D' of metal carrying metal tread-sections $r$, sections D² of hard material between the sections D', and sections D³ of cushioning material intervening between the sections D' D² and provided with base portions $q'$ against which the harder sections rest, the sections being provided with interlocking faces and fastened together under pressure, substantially as and for the purpose set forth.

THOMAS J. LOVETT.

In presence of—
  M. J. FROST,
  R. T. SPENCER.